July 2, 1940.  H. A. JACOBS ET AL  2,206,283
CULTIVATOR FOR VINEYARDS
Filed Sept. 17, 1938  5 Sheets-Sheet 5
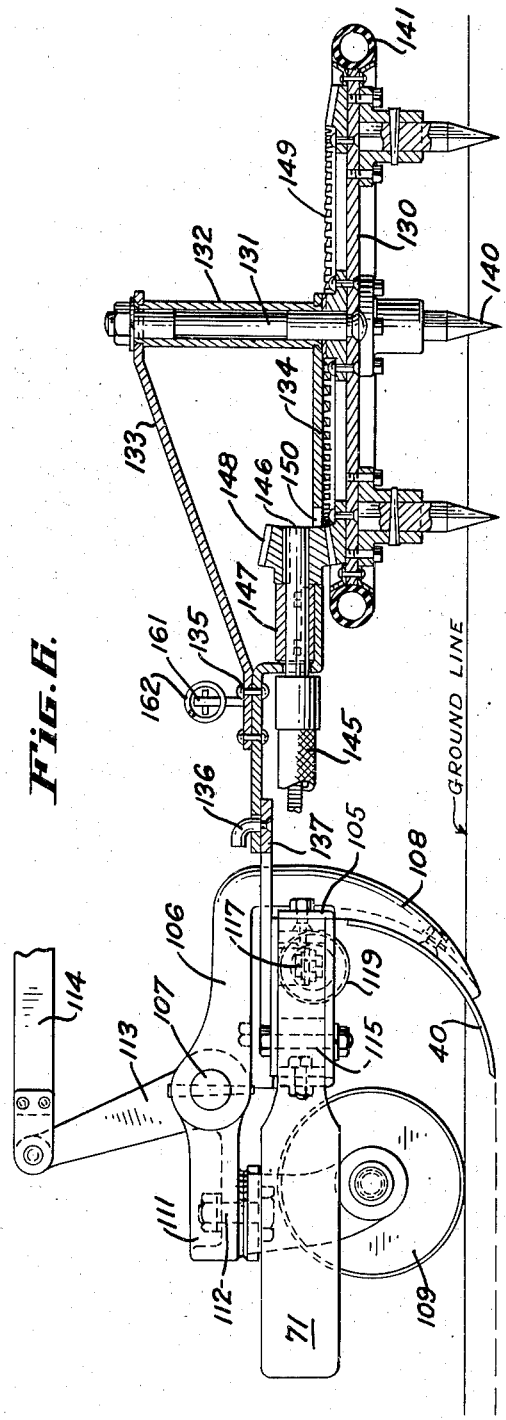
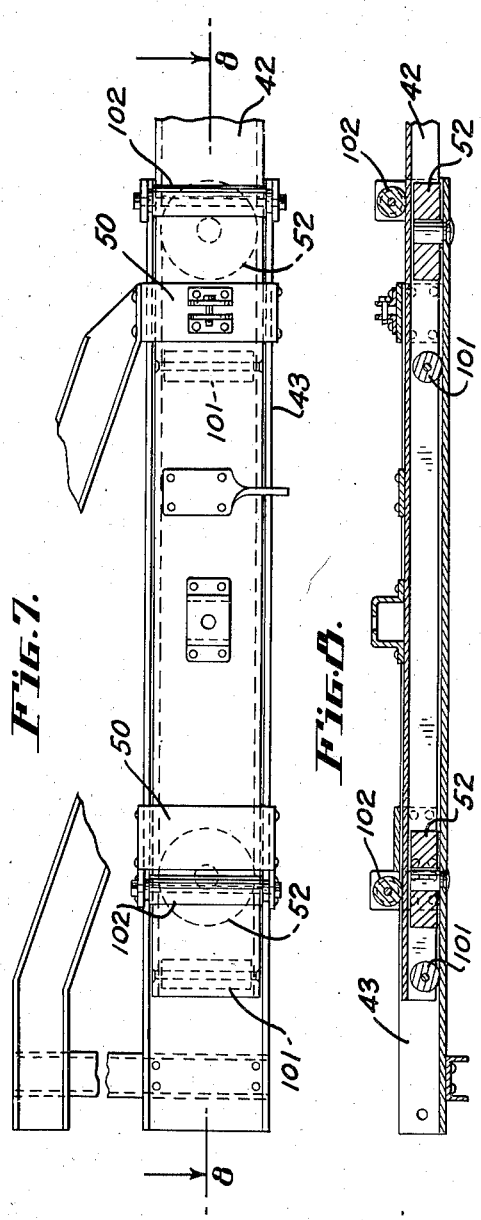
INVENTORS.
HENRY A. JACOBS
HUBERT M. ARMISTEAD
BY Jas. M. Naylor
ATTORNEY Patented July 2, 1940

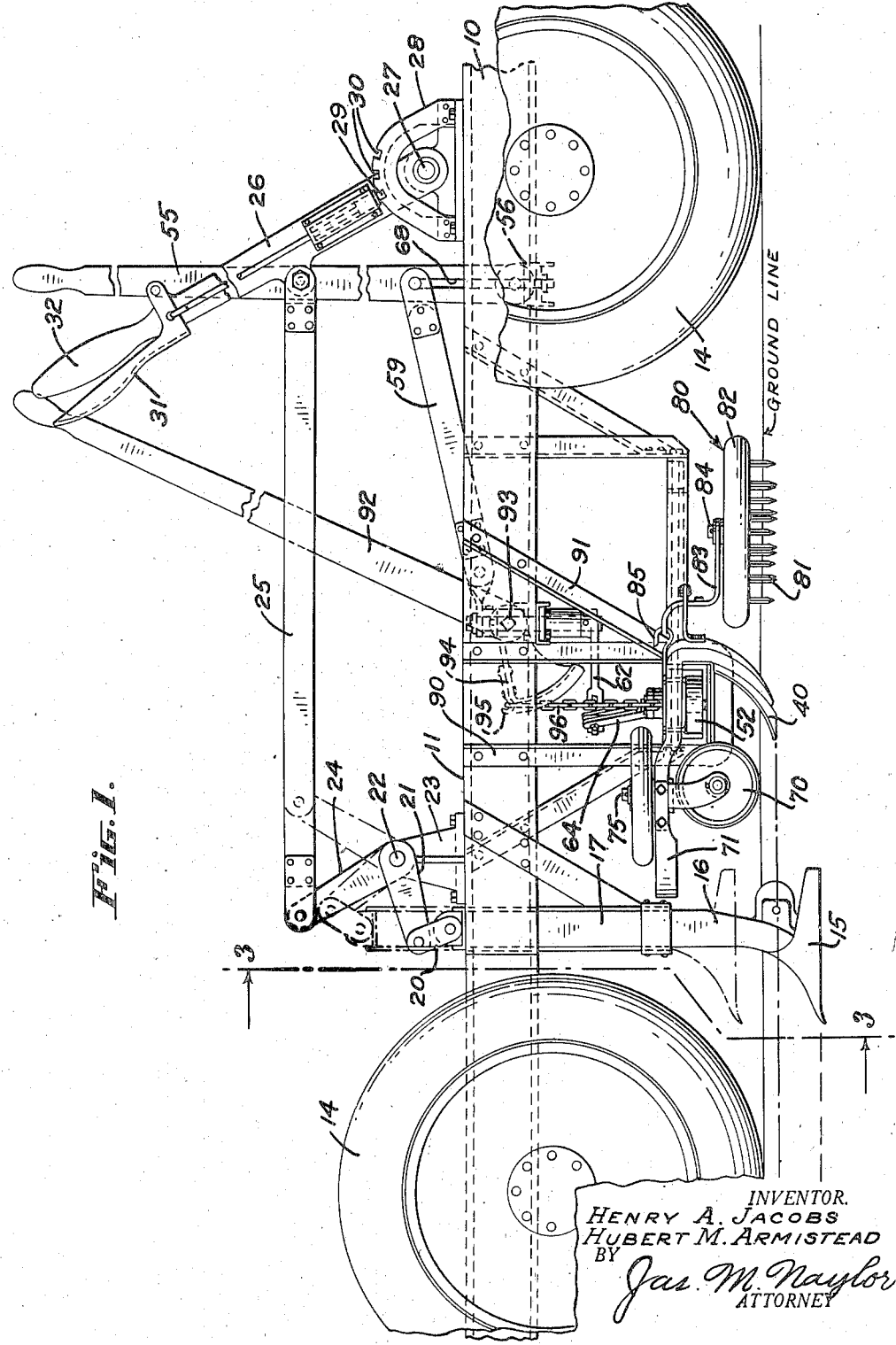

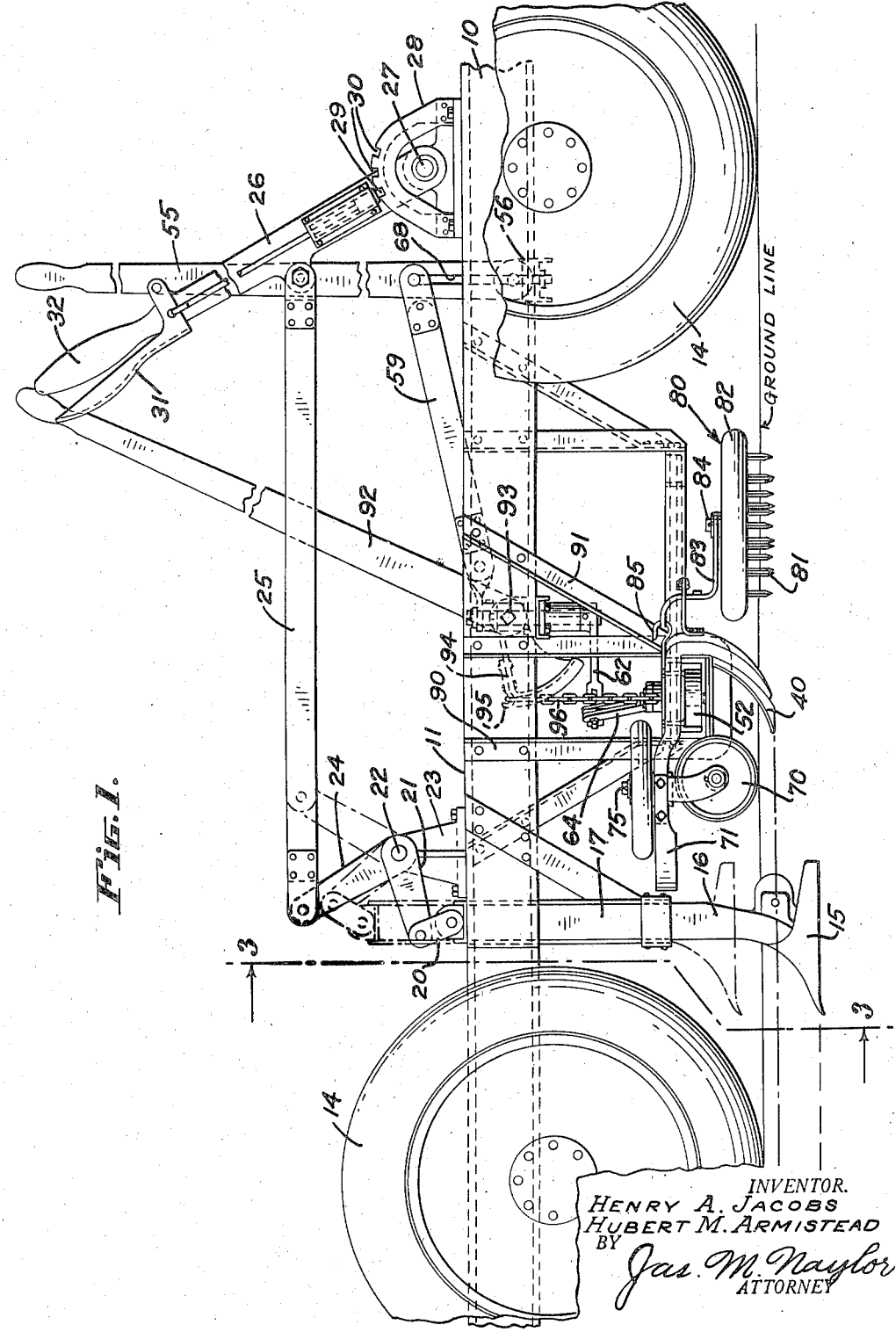

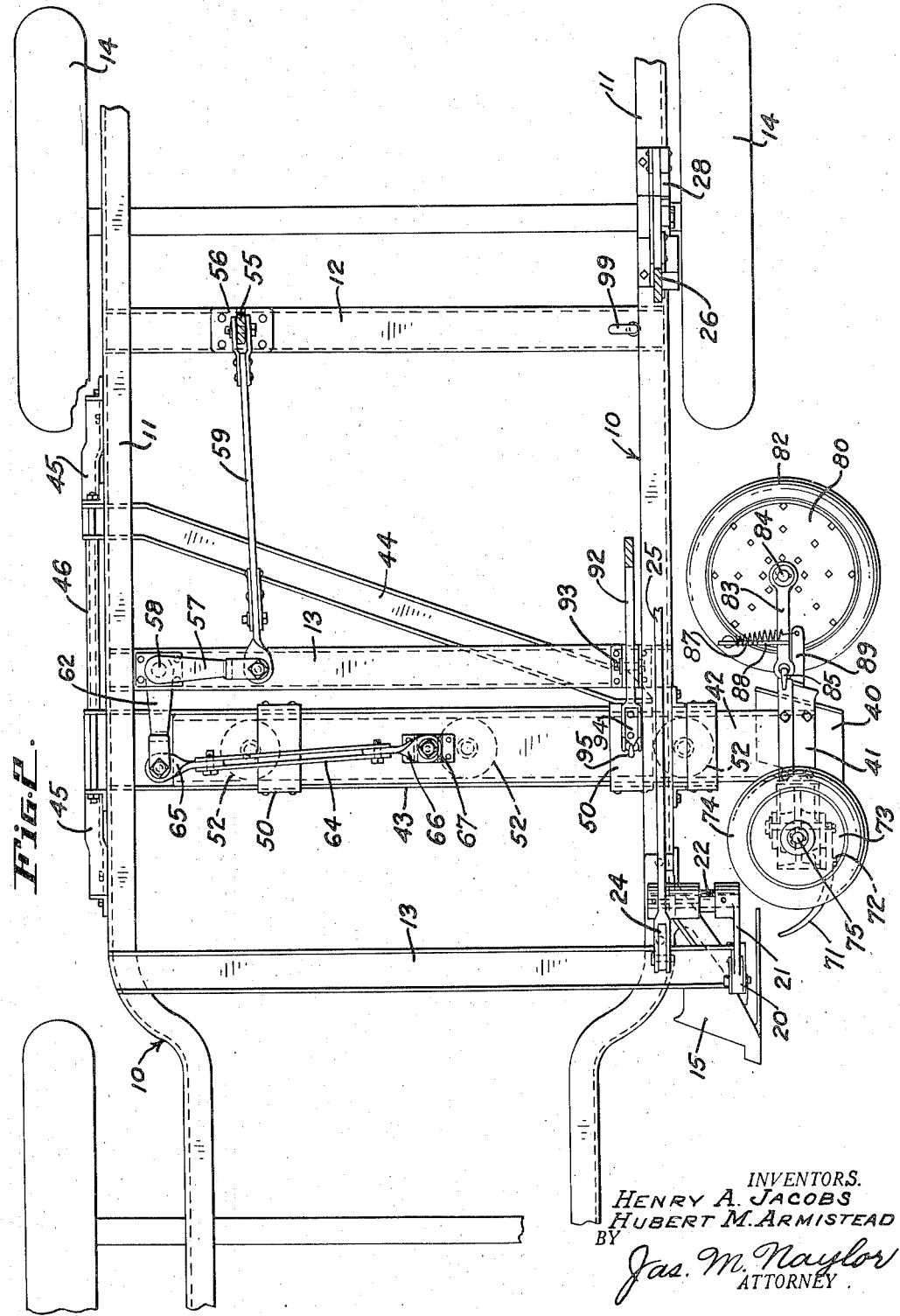

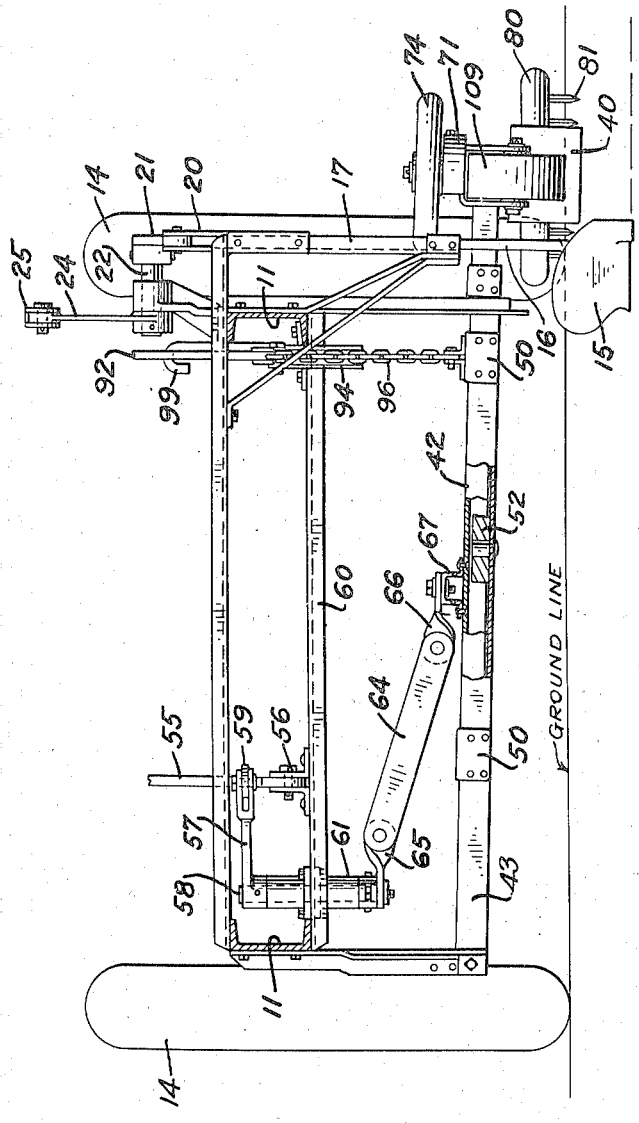

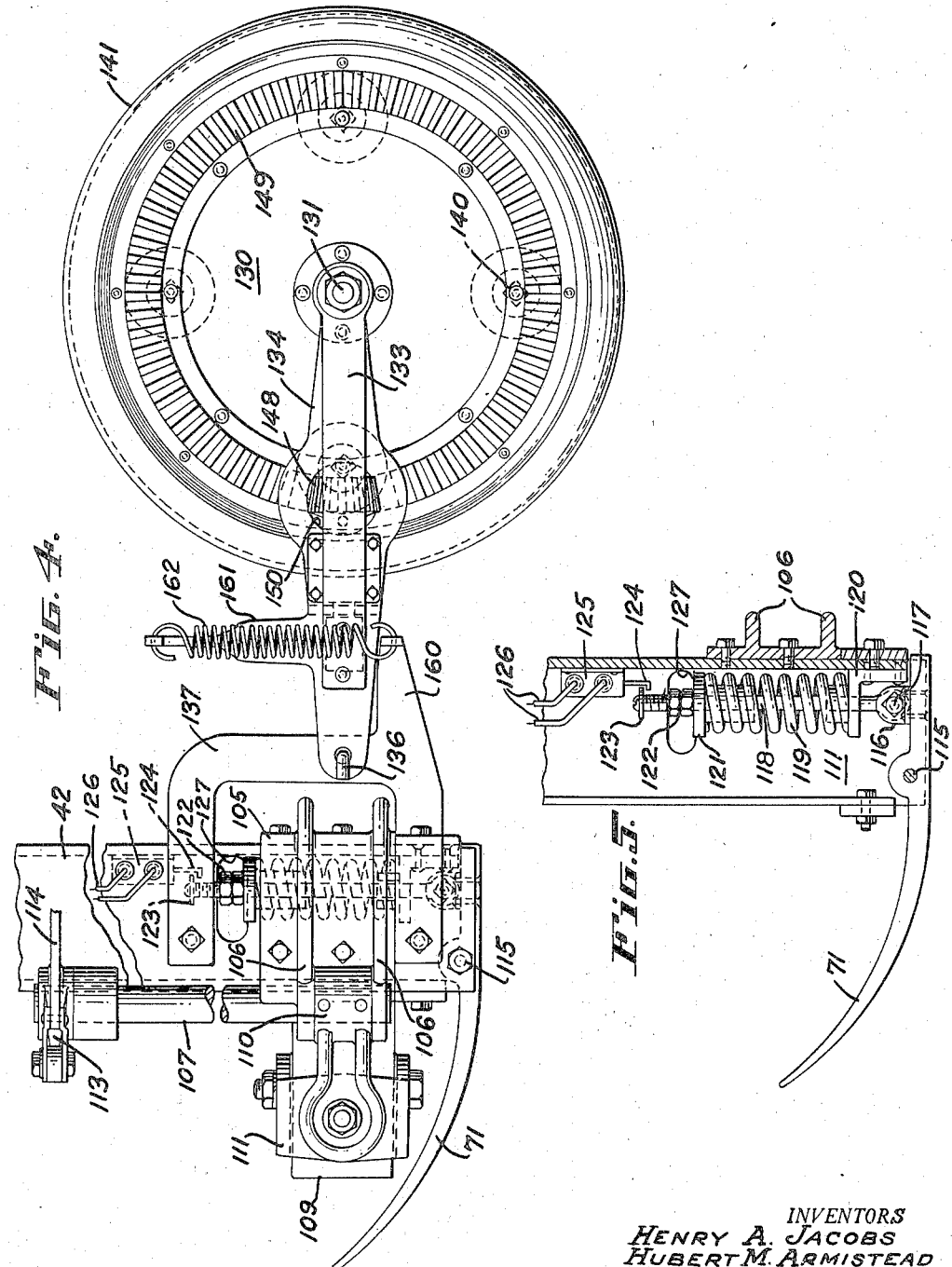

2,206,283

UNITED STATES PATENT OFFICE 2,206,283

CULTIVATOR FOR VINEYARDS

Henry A. Jacobs and Hubert M. Armistead, San Francisco, Calif.; said Armistead assignor to said Jacobs Application September 17, 1938, Serial No. 230,445

8 Claims. (Cl. 97—137)

The present invention relates to vineyard cultivators and has for its principal object the provision of efficient means for working the earth close to the vines.

For many years last past it has been the accepted practice to first plow or cultivate the widest permissible strip of earth between the rows of vines or trunks by a gang implement and, in a subsequent separate operation, work the earth between the vines in the individual rows by means of a horse drawn single plow which the operator sideslipped around the vines in order to avoid injury thereto and yet at the same time as fully as possible cultivate the surrounding earth. Frequently, if not usually, it has been necessary to manually hoe the earth about the vine trunks in order to complete this seasonal task, due to the fact that the first two steps were not wholly effectual.

These practices do not make for economy in a desirable degree and yet they have been accepted mainly for the reason that it has been generally felt that none of the mechanical means devised for the purpose were satisfactory.

It is therefore an object of this invention to provide an implement of the character described which will be highly mobile; easy to operate; fully adjustable; efficient for the intended purpose; which will adequately guard the vines against injury, and be comparatively inexpensive to manufacture.

In general terms these, and the other objects of the invention to hereinafter become apparent, are accomplished through the provision of a wheeled vehicle, preferably tractor drawn or motor driven, on which is mounted a single plow cutting a substantially straight line furrow relatively close to the vine trunks, and on which is also mounted a laterally projectable earthworking tool and cultivator means, as a follower, the former being retractable into the furrow cut by the single plow.

Moreover, convenient means are provided for regulating the depth of the furrows of the single plow and the projectable tool, respectively.

Several modifications of the present invention, also embodied herein, include novel means for facilitating the manual operation of the projectable tool; for rotating the follower cultivator means; for regulating the depth of the work performed by the projectable tool, and for controlling the ignition circuit of the prime mover employed to draw or propel the vehicle.

We are aware that there are devices in the prior art through which the general objects of the present invention were sought to be attained but to our knowledge, including practical vineyard experience, none of these devices have been adopted for general use. This is due, no doubt, to the fact that few if any have been satisfactory for the particular use, and the majority of them have been too costly and therefore out of reach of the individual vineyardist.

These and other objects of the invention will become more apparent as this specification proceeds and the novelty thereof will be particularly pointed out in the appended claims.

The invention is, as stated, particularly adapted for use in connection with cultivation of vineyards, although it is to be understood that the invention is applicable to other uses, such as cultivation of orchards or groves, and these particular applications of the invention are given as illustrations of the invention, not as limitations.

In the drawings:

Figure 1 is a side elevation of a vineyard cultivator embodying this invention,

Figure 2 is a top plan view of the vineyard cultivator,

Figure 3 is a section along the line 3—3 of Figure 1,

Figure 4 is a top plan view of a modification of the invention with particular reference to ignition control of the power means and the application of power to the cultivator means, Figure 5 is a further view of the ignition control means with parts in section for sake of clarity, Figure 6 is a side elevation of the subject matter of Figure 4, Figure 7 is a top plan view of a modification of the slidable plow mount, and Figure 8 is a section along the line 8—8 of Figure 7.

The numeral 10 designates a vehicle frame composed of the longitudinally extending angle irons 11 and transverse members 12 and 13, supported by conventional wheels such as 14.

As heretofore stated this invention contemplates the use of a single furrow plow. Such a plow is designated by the numeral 15 and, as shown in Figure 2, is positioned directly behind and slightly under the left front wheel of the vehicle. The plow 15 is mounted on a shank 16 which is slidably received in the channel iron 17 riveted or otherwise secured to the longitudinal frame member 11. Vertical adjustment of the plow 15 in order to regulate the depth of the furrow cut thereby is accomplished through the provision of the linkage illustrated to best advantage in Figure 1. A link 20 attached to the top of the shank 16 is secured at its other extremity to an arm 21 pinned or otherwise secured to the shaft 22 journaled in a bearing post or mount 23 bolted on the longitudinal frame member 11. At the opposite end of the shaft 22 there is provided an arm 24 which has a pivotal connection with rod 25 which in turn is connected to the hand lever 26. Hand lever 26 is pivotally connected as at 27 in the quadrant 28 and is provided with a spring urged detent 29 which engages the notches 30 in the quadrant 28 and is manually releasable upon movement of the lever 31 in juxtaposition to the handle 32.

It will thus be seen that manual movement of the lever 26 between the positions defined by the notches 30 in the quadrant 28, through the linkage just described, will cause shank 16 and the plow member 15 carried thereby to be raised or lowered in relation to the channel iron 17.

As heretofore stated, the plow 15 is adapted to cut a furrow outside of the ground working between the rows effected by the gang implement first drawn through the vineyard. The function of the plow 15 in addition to the working of the soil for normal cultivation purposes is also for the purpose of facilitating the movement of the retractable plow now about to be described.

While a plow share 40 has been illustrated and will be described, it will be understood and appreciated that any earthworking tool, such as a disk, may be substituted therefor. Since many different conditions are likely to be encountered, the tool selected is regarded as a mere matter of choice.

The plow share 40 is attached to a frame 41, which in turn is rigidly connected to a slidable carriage 42, in the form of an inverted channel iron. The carriage 42 is slidably received in a U-shaped frame member 43, extending transversely of the vehicle frame 10. The frame member 43 has an angularly disposed brace 44 and said frame and brace are hingedly connected to longitudinal frame member 11 by means of lugs 45 and a pin 46.

A plurality of straps 50 over frame member 43 serve to retain the carriage 42 therein against vertical displacement. Friction between the slidable carriage 42 and frame member 43 is overcome by the provision of the rollers 52 fixed in the bottom of frame 43 which engage the sides of the carriage 42. Reciprocation of the carriage 42 in frame 43 and of course projection and retraction of the plow 40 supported on said carriage, is accomplished through the medium of the following mechanism. Hand lever 55, pivotally attached to the transverse frame member 12, as at 56 (see Figure 2), has an operative connection with the arm 57 pinned on a shaft 58 through the medium of the rod 59. Rod 59 has a conventional slotted connection with lever 55, as at 68 (see Figure 1). Shaft 58, is journaled in a supplement transverse frame member 60 as at 61 (see Figures 1 and 3) and at its lower extremity there is connected a second arm 62 disposed at right angles to the arm 57 in a manner to prescribe a bell crank. The arm 62 has an operative connection with carriage 42 through the medium of a rod 64, there being a pair of reverse twisted links 65 and 66 disposed at the ends thereof for connection to the arm 62 and an upstanding member 67 on said carriage 42.

It will thus be seen that by forward and rearward movement of the hand lever 55, through the linkages just described, the carriage 42 will be caused to reciprocate in its frame member 43.

A relatively large caster wheel 70 is positioned directly in front of the plow 40, being attached to the frame member 41. The wheel 70, as will be noted from Figure 1, rolls over the earth directly before the plow 40 and serves to support the end of carriage 42 and the other devices, presently to be described, connected to frame 41.

As a means of guarding against injury to the vine trunks, should there be any delay or miscalculation upon the part of the operator in lateral movement of plow 40, there is provided an arcuate guard member 71 which is bolted to the frame 41 as at 72 (see Figures 1 and 2). A secondary guard in the form of a wheel 73, having a tire 74 thereon, is mounted on the swivel 75 of caster wheel 70 which, as will be noted in Figure 1, projects through the frame 41.

As an additional means of breaking the soil in close proximity to the vine trunks there is provided a circular harrow 80 having conventional teeth 81 and a rubber tire 82. As will be noted from Figures 1 and 2 the harrow 80 has a flexible connection with frame 41 comprising an arm 83 at one end of which the harrow is rotatably connected as at 84 and the other extremity of which arm is attached to a hook 85 on the frame 41. Harrow 80 is adapted to turn freely about its pivotal connection 84 with arm 83. Also it is adapted to lag in the projection and retraction of plow 40. That is to say, as plow 40 is projected outwardly and retracted inwardly with respect to vehicle frame 10, harrow 80 would be normally swung from side to side and be dragged along to the inside and outside of the furrow being cut by plow 40. The movement of harrow 80 outside of the furrow cut by plow 40 is, of course, desirable in that it enables the harrow to work very close to the vines and to completely break up the soil thereabout. It will be noted that if plow 40 be retracted with respect to vehicle frame 10 the harrow 80 would be thrown or drawn against the vine trunk, the latter being protected by the tire 82. As a means of normally maintaining alignment between harrow 80 and plow 40 there is provided a spring member 87, one end of which is connected to an arm 88 mounted on arm 83 and at right angles thereto, the other end of spring 87 being connected to arm 89 projecting rearwardly from frame 41.

It has been heretofore pointed out that frame 43 is hingedly connected at that side of the vehicle frame 10 opposite the plow 40. The purpose of this is to permit the raising and lowering of plow 40 from the ground at the ends of the rows as the vehicle 10 is turned.

As will be noted from Figure 1, frame 43 is retained for this vertical adjustment of plow 40 by the U-shaped supplemental frame member 90 bolted to longitudinal main frame member 11, there being auxiliary brace member 91 attached to frame member 11 and the U-shaped member 90 to relieve strain on the latter. A hand lever 92 pivotally mounted as at 93 on the transverse frame member 13 is provided with a segmental foot 94. A hook 95 on the foot 94 has an operative connection with carriage frame 43 by means of the chain 96. It will be seen from the foregoing that manual movement of lever 92 will cause frame 43 to be raised or lowered in U-shaped member 90, thus raising or lowering carriage 42 and the plow 40 carried thereby. A hook 99, fixed on transverse frame member 12, is provided to hold hand lever 92 and thus lock plow share 40 in its uppermost position while vehicle 10 is being turned.

It will be appreciated that the mechanism just described could readily be converted to a means for regulating the depth of the furrow made by plow share 40, by the provision of a conventional quadrant for hand lever 92 and by providing for the adjustment of the position of caster wheel 70. In this connection attention is invited to the modification of this phase of the invention shown in Figures 4 and 6 and the description of same to follow.

Operation

The vehicle 10 is drawn or moved, if in the desired form the subject matter of this invention be applied to a tractor chassis, through the rows between the vine trunks. Plow 15 is set to cut a furrow of the desired depth outside of the earth-working effected by a gang implement which has theretofore passed down the particular row. By manipulation of hand lever 55 plow 40 and the mechanism associated therewith, is projected outwardly from vehicle frame 10 to a point in line with the vine trunks in the particular row, the operator having first adjusted plow 40 to a determined depth by manipulation of hand lever 92. As the vehicle moves forwardly, and the guard 71 approaches a vine trunk, the operator manipulates hand lever 55 to retract plow 40 and associated devices away from the trunk and inwardly toward the vehicle. In this movement harrow 80 will be lagged about the trunk and the teeth thereof will thoroughly work the adjacent soil.

As plow 40 passes the particular trunk the operator again manipulates hand lever 55 to project the plow around the far side of the trunk and back into the line between the trunks in the particular row. Again harrow 80 will be lagged about the trunk and urged into alignment behind plow 40 through the medium of the spring 87.

It will be appreciated that the movement of plow 40 will be relatively small, being measured in a matter of inches. This movement of plow 40, as heretofore set forth, is greatly facilitated by the fact that the blade is actually slipped or knifed in and out of the furrow cut by plow 15. Thus the strain on the operator and the actuating mechanism is reduced to a negligible minimum.

In Figures 7 and 8 of the drawings there is shown a modification of the reciprocal carriage 42 and the frame 43 therefor. The modification consists principally in the provision of additional roller members as a means of further reducing friction and facilitating the manual movement of said carriage 42. In the modified form it will be noted that carriage 42 has been given the form of an inverted U-shaped member slidably received in the channel iron frame member 43, the latter being provided with rollers such as 52 against which the sides of the U-shaped carriage 42 are adapted to bear in the longitudinal movement of the said carriage 42 in frame 43. Rollers 101 are mounted within the carriage member 42 and adapted to bear against the bottom of frame member 43 (see Figure 8). Additional rollers 102 are disposed across the top of frame member 43 and are adapted to bear against the top of carriage 42 to relieve the vertical stress which would normally be borne by the strap members 50 alone.

In Figures 4 and 6 there is shown a modification of the frame 41 and the means for regulating the furrow cut by the plow 40. In this form a plate 105 is bolted or otherwise secured at the end of the carriage 42. Said plate includes as an integral part the rib-like members 106 which at their forward ends define a bearing mount for a shaft 107 and the rear ends of which are curved over the frame 105 as dependent forwardly inclined shanks 108 to which a conventional plow share 40 is bolted. A spacer or bearing member 110 pinned on shaft 107 between the ends of the rib-like members 106 is provided with a forwardly extending lug 111 which serves as a mount for the swivel 112 of a caster wheel 109.

As will be appreciated from inspection of Figure 6 of the drawings, and bearing the above description in mind, vertical movement of caster wheel 109 with respect to plow 40 will determine the depth of the furrow cut by the latter. This adjustment is effected by means of a conventional hand lever having the usual quadrant (not shown) having an operative connection with shaft 107 through the medium of a rod 114 and an arm 113, the latter being pinned to said shaft 107. Thus manipulation of the connected hand lever, through the described linkage, will effect rotation of shaft 107 and cause caster wheel 109 to be raised or lowered as desired.

In Figures 4 and 5 of the drawings there is shown a further application of the principles of the invention in conjunction with the provision of means for controlling the ignition system of the tractor upon which the devices are mounted or by which the vehicle is moved.

In this instance the trunk guard 71 is pivotally connected adjacent its inner end to frame member 111 as at 115 (see Figures 4 and 5). The inner end of the trunk guard is connected by means of bracket 116 and the conventional nut and bolt 117 to a pin 118 which is encircled by a helical spring 119 disposed between a bracket 120 on frame member 111 and a plug 121, the latter being retained on the pin by the lock nuts 122. Access to lock nuts 122 is provided through an aperture 127 in carriage 42. A washer 123, secured at the free end of pin 118 is adapted to engage the angled end of the rod 124 in a conventional pull switch 125. The switch 125 is of the type normally urged into closed position by any conventional yieldable means and is provided with the conventional lead wires 126 to the ignition circuit of the tractor. From the foregoing it will be seen that when trunk guard 71 strikes a vine trunk, due to delay or miscalculation upon the part of the operator in retracting the associated mechanism; the trunk guard 71 is swung about its pivot 115 and exerts a pull upon rod 118 compressing spring 119, and washer 123 thereon will pull switch rod 124 to break the circuit and cut off the ignition of the tractor. Since there is no momentum in a tractor the same will be brought to an immediate stop before injury to the particular vine.

In Figures 4 and 6 there is shown a modification of the harrow construction illustrated in Figures 1 and 3. Here the harrow comprises a disk 130 rotatably mounted on a stub axle 131 suitably journaled in a bearing 132 retained between an upper frame member 133 and a lower frame member 134. The frame members 133 and 134 converge at their other extremities and are bolted together as at 135, an extension on frame member 134 being connected to frame 105 through the medium of a hook and eye 136, the former being disposed on a U-shaped bracket 137 bolted to the frame member 105. The harrow 130 is provided with conventional teeth 140 which in the illustrated form are harrow teeth, for which may, of course, be substituted